J. A. HULIT.
SELECTIVE SIGNALING SYSTEM.
APPLICATION FILED MAR. 16, 1912.

1,221,801.

Patented Apr. 3, 1917.
7 SHEETS—SHEET 1.

WITNESSES
Arthur J. Ray.
Albert Anderson.

INVENTOR
John A. Hulit
By Buckley & Durand
ATTORNEYS

J. A. HULIT.
SELECTIVE SIGNALING SYSTEM.
APPLICATION FILED MAR. 16, 1912.

1,221,801.

Patented Apr. 3, 1917.
7 SHEETS—SHEET 2.

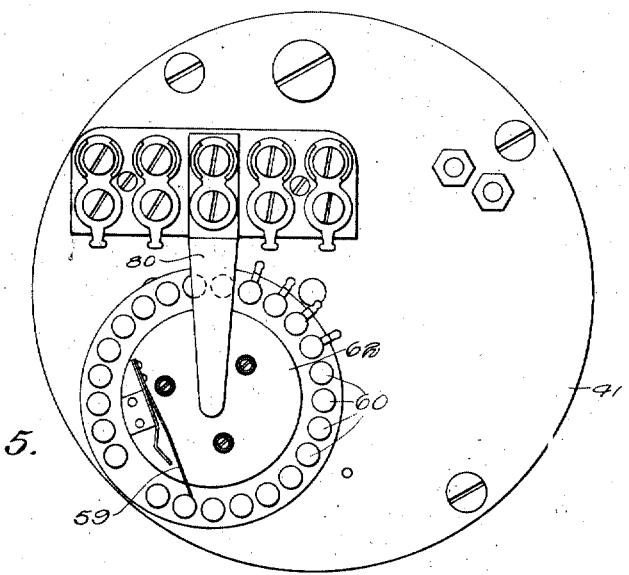
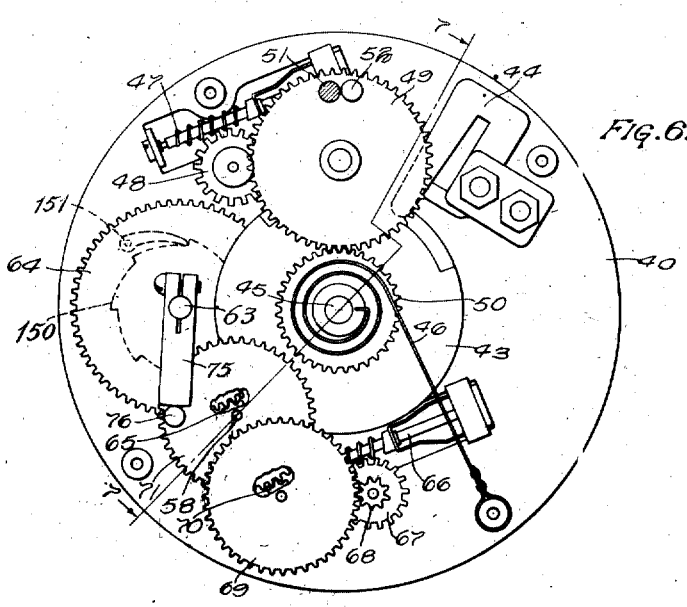

J. A. HULIT.
SELECTIVE SIGNALING SYSTEM.
APPLICATION FILED MAR. 16, 1912.

1,221,801.

Patented Apr. 3, 1917.
7 SHEETS—SHEET 4.

J. A. HULIT.
SELECTIVE SIGNALING SYSTEM.
APPLICATION FILED MAR. 16, 1912.
1,221,801.
Patented Apr. 3, 1917.
7 SHEETS—SHEET 5.
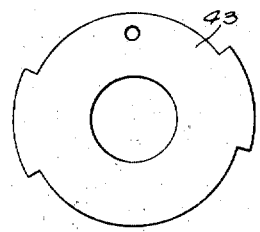
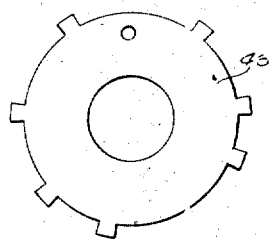
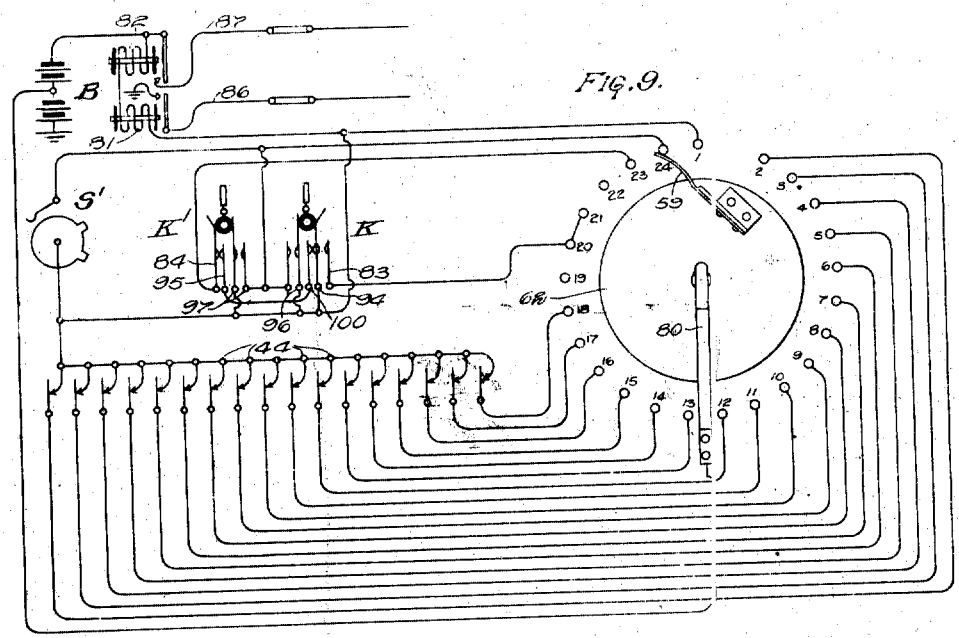

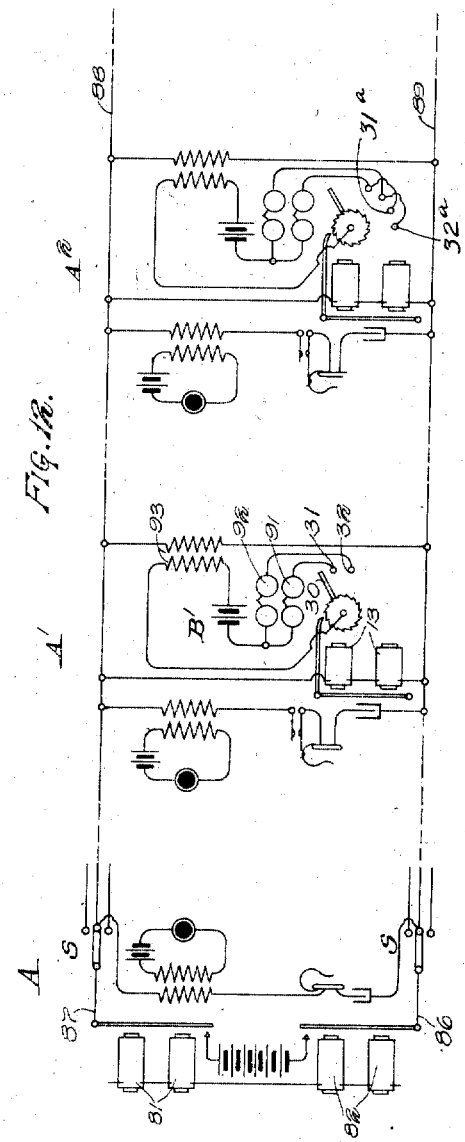

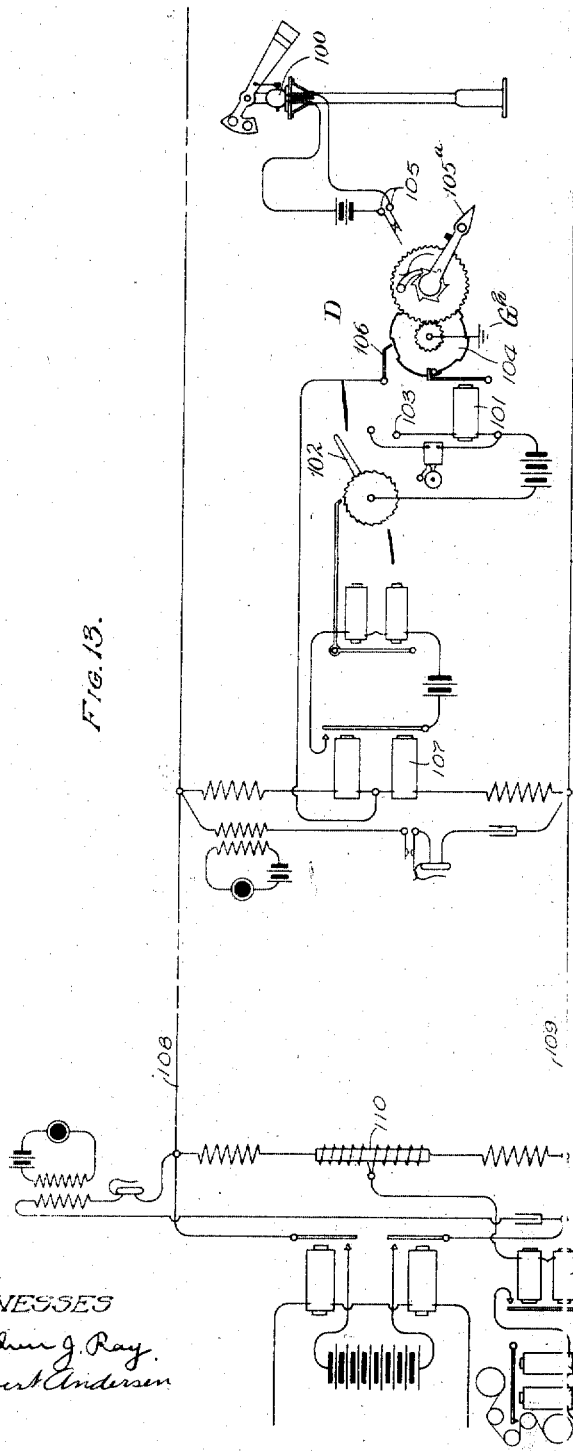

UNITED STATES PATENT OFFICE.

JOHN A. HULIT, OF CHICAGO, ILLINOIS, ASSIGNOR TO AUTOMATIC ELECTRIC COMPANY, OF CHICAGO, ILLINOIS, A CORPORATION OF ILLINOIS.

SELECTIVE SIGNALING SYSTEM.

1,221,801.     Specification of Letters Patent.     Patented Apr. 3, 1917.

Application filed March 16, 1912. Serial No. 684,114.

*To all whom it may concern:*

Be it known that I, JOHN A. HULIT, a citizen of the United States of America, and resident of Chicago, Cook county, Illinois, have invented a certain new and useful Improvement in Selective Signaling Systems, of which the following is a specification.

My invention relates to selective signaling systems and apparatus for use in connection with such systems, and it relates more particularly to selectively signaling stations over a telephone or telegraph line. In this connection it is particularly adapted for use in connection with telephone train despatching systems.

Among the objects of my invention is to provide a code impulse-sending apparatus by which a plurality of groups of impulses can be transmitted over the signaling line in order to select any desired substation thereon.

A further object of my invention is to provide means to avoid having the battery always connected to one side of the line, and to enable the impulse generator to work with a low voltage and the line instruments—that is, the instruments at the stations along the line—to work with a high voltage.

A further feature of my invention is the provision of means in the signaling apparatus associated with the line whereby any or all of the signaling devices may be released with a single impulse followed by a space.

A further new feature is the provision of a signaling instrument of the character described having a plurality of bank contacts in combination with a wiper whereby the wiper may be carried into engagement with a plurality of circuits at one time.

A further object is the provision of means whereby by a single operation of the dial a connection can be built up at one of the stations and a short ring automatically given. By a second operation of the dial the connection is completed and the bell begins to ring and continues to ring for a period of time.

A further feature is an improved answer-back arrangement whereby the operator is advised of the fact that the signal at the station being called is being operated.

These and many other features and objects of my invention will be more particularly pointed out in the following description in which I have illustrated one particular embodiment of my invention.

In the accompanying drawings Figure 1 is a plan view of a substation selector.

Fig. 5 is a rear view of the calling device.

Fig. 6 is a similar view with the plate 41 removed.

Figs. 8 and 9 represent the circuit connections of the calling device.

Figs. 10 and 11 are detail views of parts of the calling device.

Fig. 12 represents a line circuit comprising one central station and two substations.

Fig. 13 represents a line circuit in which the substations are provided with semaphores.

Figure 1:
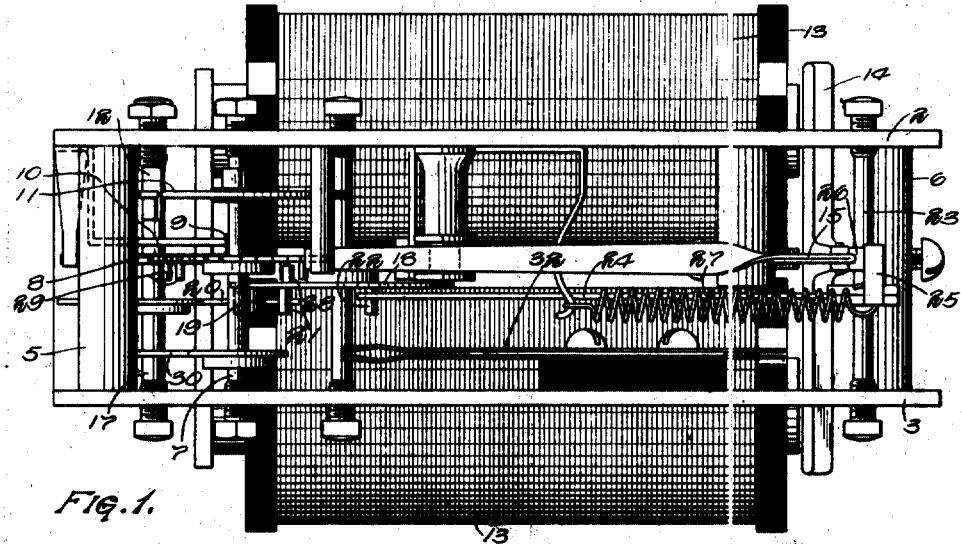
Figure 2:
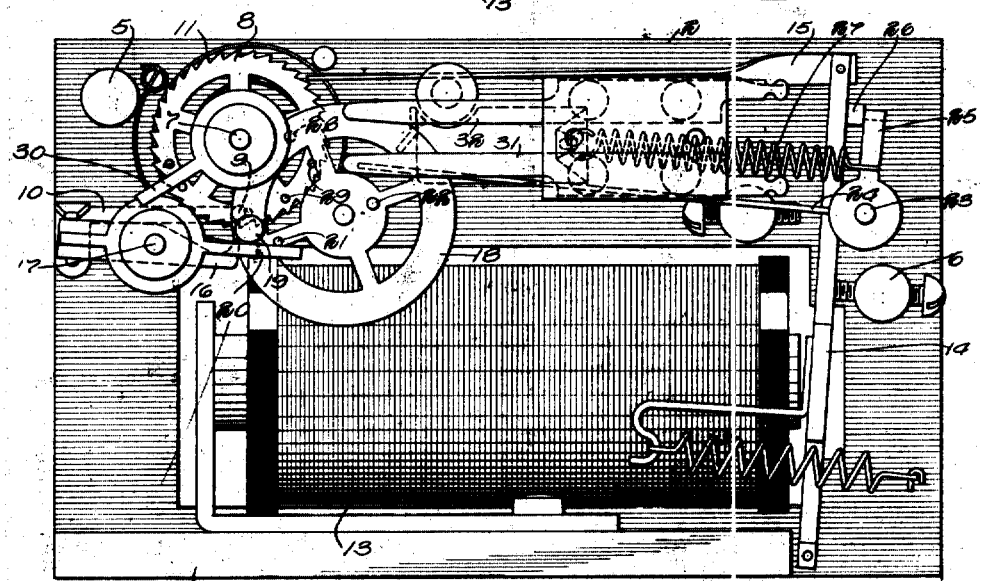
Fig. 2 is an elevation of the same with the side plate 3 removed.

The mechanism of the substation selector shown in Figs. 1 and 2 is mounted between two mounting plates 2 and 3 which are secured to the base block 4 and the spacing posts 5 and 6. Journaled between the plates 2 and 3 there is a shaft 7 carrying a ratchet wheel 8 rigidly secured thereto. The shaft 7 is maintained in its normal position with the pin 9 in the wheel 8 resting against the stationary stop post 10 by means of a small spiral spring 11, one end of which spring is secured to the shaft 7 and the other end to the pin 12. The ratchet wheel 8 may be rotated forward by means of an electromagnet 13 through the medium of its pivoted armature 14 and the pawl 15, which latter is secured to the upper end of said armature. For maintaining the ratchet wheel in any advanced position against the tension of the spring 11 there is a holding pawl 16 which is rigidly secured to the shaft 17, which shaft is pivoted between the side plates 2 and 3. This pawl is held in engagement with the ratchet wheel by the preponderance of weight of its rear end. A throw-off is provided for the holding pawl 16, said throw-off comprising a balance wheel 18 which is secured to a shaft pivoted between the side plates. Near the rim of the wheel 18 there is a weight 19 which tends to rotate the wheel in a counter-clockwise direction, as shown in Fig. 2. Secured to the shaft 17 with the pawl 16 there is a lever 20 which projects into the path of a pin 21 in the side of the wheel 18. In the same side of the wheel 18, approximately diametrically opposite the pin 21, there is a second pin 22. Pivoted between the plates 2 and 3, behind the armature 14, there is a shaft 23 to which there is secured a long arm 24 which projects above the pin 22. Secured to the shaft 23 there is also a vertical arm 25 which rests against the lug 26 on the armature 14. A helical spring 27 tends to turn the shaft 23 to tip the arm 24 downward, but is normally restrained by the engagement of the arm 25 with the lug 26. When the magnet 13 is energized, the armature 14 is drawn forward, the pawl 15 rotates the wheel 8 forward one step and the arm 24 is tipped downward by the spring 27. When the arm 24 is tipped downward it strikes the pin 22 to rotate the wheel 18 in a clockwise direction to cause the pin 21 to rise and allow the holding pawl 16 to rise into engagement with the teeth of the wheel 8 to hold it in its advanced position. When the magnet 13 is deënergized, the armature 14 drops back and raises the arm 24, whereupon the throw-off 18 begins to restore to normal position. If the magnet 13 remains deënergized for a sufficient length of time, the wheel 18 restores far enough for the pin 21 to strike the lever 20 to withdraw the pawl and permit the wheel 8 to restore to its normal position. The wheel 18, however, is only slightly overbalanced and therefore rotates backward slowly, so that if the magnet 13 is energized again quickly it may arrest the return of the throw-off 18 before it has released the wheel 8, and said wheel will be advanced a second step and retained in this position. It is thus evident that the wheel 8 may be advanced continuously step by step if the deënergizations of the magnet between steps are of short duration only, but if a deënergization of a longer duration ensues the wheel will be released. In the side of the wheel 18 there is a pin 28 and in the side of the wheel 8 there are a number of pins 29. The paths of rotation of the pins 28 and 29 intersect. The pins 29 are so arranged that when the wheel 8 has been advanced a certain number of teeth, one of said pins 29 will be advanced into the path of the pin 28. When a pin 29 is thus in the path of the pin 28 it arrests the return movement of the throw-off 18 and will prevent the throw-off of the pawl 16 when the magnet 13 is deënergized for a long period. There are a plurality of the pins 29 in the wheel 8, so that the magnet 13 may be deënergized for a long period at different points in the rotation of the wheel 8 without releasing said wheel. Secured to the inside of the plate 3, but insulated therefrom, there are two pairs of electrical contacts 31 and 32 which are adapted to be contacted by an arm 30 on the shaft 7 after the wheel 8 has been rotated a certain number of steps. From the foregoing it is evident that the wheel 8 may be rotated to bring the arm 30 into contact with the springs 32 and 31 by a certain number of successive impulses through the magnet 13, or by a series of groups of impulses separated by prolonged deënergizations of the magnet. For instance, if a sufficient number of impulses are transmitted through the magnet to rotate the first pin 29 into the path of the pin 28, then the magnet may be deënergized as long as desired without causing the wheel 8 to be released. In a similar manner the magnet 13 may be deënergized any length of time while either of the next two pins 29 is in the path of the pin 28. The last two pins 29 are positioned so that when they are in the path of the pin 28 the arm 30 is in engagement with the springs 32 and 31, respectively. It is thus evident that the position of the first three of the pins 29 determines the grouping of the impulses by which the selector may be operated. Thus, if a plurality of the selectors are operated in multiple and the positions of the first three pins 29 are not the same in any two of them, and if pauses occur in the impulses every time one of the pins 29 in some particular selector comes into the path of the pin 28, it will be seen that the wheel 8 of this selector will be continuously progressed, while the wheels 8 in all the others will be released at least once and will not, therefore, be fully operated if the total number of impulses sent are only sufficient to operate the selector which has not been released.

Referring now to Figs. 3 to 8, inclusive, the construction of the calling device is as follows: Journaled in two plates 40 and 41 (Fig. 7), which are held apart by suitable posts, there is a shaft 45 to the end of which, in front of a cover plate 99, there is secured a dial 42 provided with a plurality of finger holds. Secured to this shaft there are a plurality of toothed cam wheels 43, two of which are shown in face view in Figs. 10 and 11. Above the wheels 43 there are a corresponding number of normally closed pairs of contact springs 44. Upon the lower end of the long spring of each pair there is a small lateral projection which projects into the path of the teeth of the wheel 43, so that whenever the teeth on any one of the wheels come directly under its pairs of springs, said springs are separated. As shown herein, the teeth on the different wheels 43 are so arranged that in each rotary position of the shaft, corresponding to the finger holds of the dial 42, three pairs of springs are opened, a different combination of pairs being operated in each position. Around the rear end of the shaft 45 there is a lock spring 46 for the purpose of returning said shaft to normal position after it has been rotated forward through the medium of the dial 42. The speed of rotation of the shaft 45 is controlled by a small governor 47 which is connected with the said shaft through the medium of the gear wheels 48, 49 and 50. A pin 51 in the plate 41 serves as a normal stop for the shaft 45 by being engaged by the pin 52 in the gear wheel 49.

Figure 3:
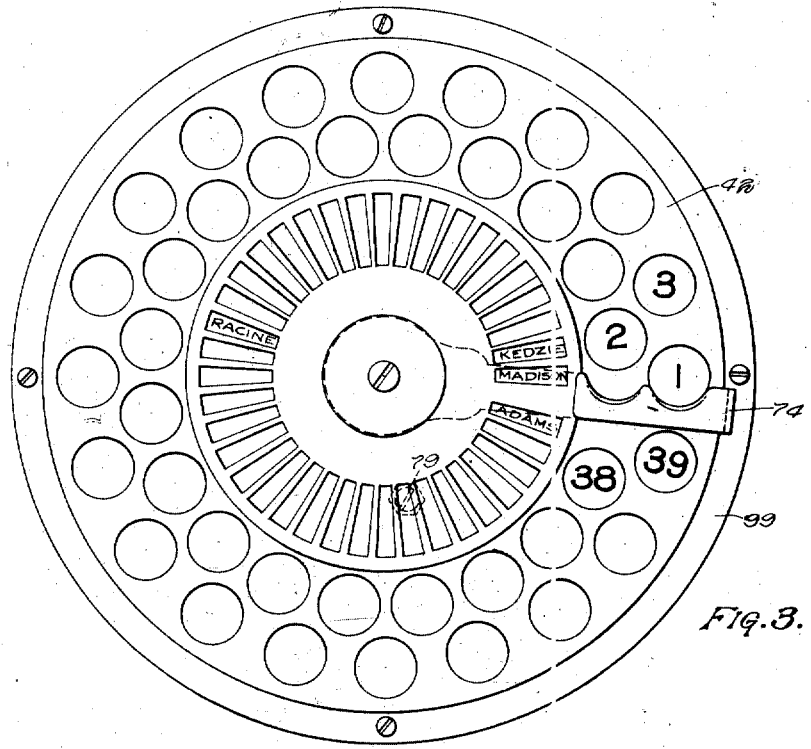
Fig. 3 is a front view of the main office calling device.
Figure 4:
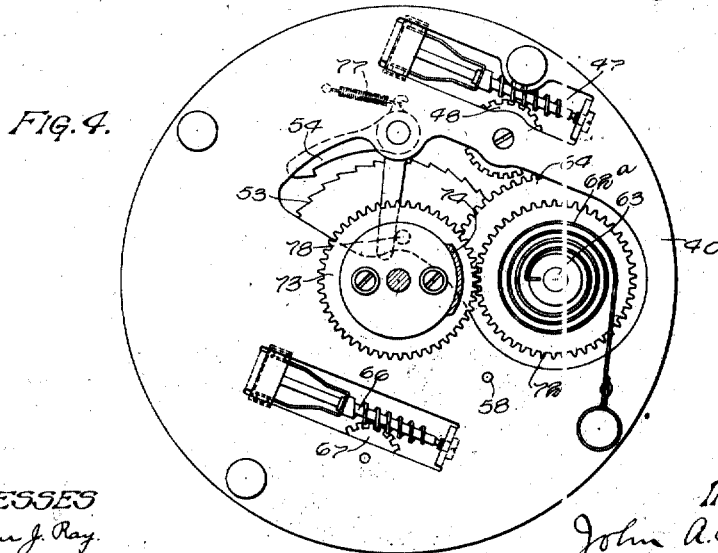
Fig. 4 is a front view of the calling device with the dial and finger lever removed.
Figure 7:
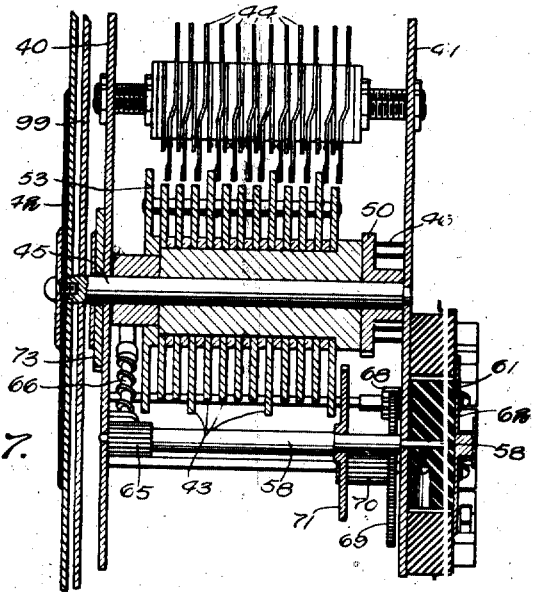
Fig. 7 is a sectional view of the same on line 7—7 in Fig. 6.

Journaled in the plates 41 and 40 there is also a shaft 58 to the rear end of which there is secured a disk of insulation 61 to the face of which there is secured a metallic plate 62, upon which latter there is mounted a wiper or brush 59 (Fig. 5) which is adapted to rotate over and make contact with a plurality of insulated contact points 60. The power for rotating the shaft 58 is supplied by a clock spring 62$^a$ (Fig. 4) on the shaft 63. The power is transmitted from the shaft 63 to the shaft 58 through the medium of the gears 64 and 65. The gear wheel 64 is not rigidly secured to the shaft 63, but is loosely mounted thereon and connected therewith through the medium of a pawl 151 and ratchet 150 so as to rotate with the shaft in one direction only. The speed of rotation of the shaft 58 is controlled by the governor 66 through the medium of the gears 67, 68, 69, 70 and 71. Secured to the shaft 63, in front of the plate 40, there is a gear wheel 72 which meshes with a gear wheel 73 which is loosely mounted upon the shaft 45. Secured to the gear wheel 73 there is an arm 74 which extends up through an opening in the cover plate 99 and radially out behind the dial, and is then bent back over its face, the end extending inward beyond the inner row of finger holds. The stop for stopping the shaft 58 in normal position comprises a lever 75 on the shaft 63, which lever is engaged by a pin 76 in the wheel 71. Secured to the shaft 45 just back of the front plate 40 there is a ratchet wheel 53 which is adapted to be engaged by a ratchet 54, which latter, however, is normally held out of engagement with the ratchet wheel 53 against the tension of a spring 77 by a pin 78 in the back of the wheel 73. The downward movement of the lever 74 is limited by a stop 79 on the plate 99 (Fig. 3).

The mode of operation of the calling device is as follows: Each of the finger holds of the dial 42 is numbered or otherwise designated in accordance with the designation of the substations to be called by it. In order to call any substation a finger is inserted in a finger hold of the dial and the dial is rotated until the finger strikes the lever 74 and forces it down against the stop 79. Upon the initial movement of the lever 74 the ratchet 54 is released and drops down into the teeth of the ratchet wheel 53. As the lever 74 continues to be pulled down it winds up the spring 62$^a$ and rotates the lever 75 (Fig. 6) out of the path of the pin 76. The wheel 64, and consequently the shaft 58, do not rotate during this forward movement of the lever 74 because of the ratchet connection between the shaft 63 and the wheel 64. The pitch of the worm of the governor 66 and the wheel 67 is such as to prevent a backward rotation of the governor by said wheel, which serves as a positive lock to prevent the shaft 58 from being rotated backward. After the finger lever 74 has come into contact with the stop 79, the finger is removed from the finger hold, whereupon the lever 74 begins to be restored to its normal position by the spring 62$^a$, while the dial remains held in its advanced position by the ratchet 54. As the lever 74 returns to normal position, the shaft 58 is rotated also to cause the wiper 59 to rotate over the contacts 60. The ratio of the gear wheels is so chosen that while the lever 74 is returning from its operated position to its normal position the shaft 58 will make one complete revolution. Therefore, when said shaft completes its revolution, the pin 76 finds the lever 75 again in its path, whereby both the shaft 58 and the finger lever 74 are brought to rest in normal position. Just before the finger lever reaches its normal position, however, the pin 78 forces the ratchet 54 out of the teeth of the wheel 53 and allows the dial to be restored to its normal position by the spring 46. It will thus be seen that whenever the calling device is operated, the wiper 59 makes one complete revolution over the contacts 60, while the dial remains in some advanced position, corresponding to the finger hold used on the dial. As has been explained, when the dial is rotated it causes the cam wheels 43 to separate three different pairs of the springs 44 in each of its stop positions.

Figure 8:
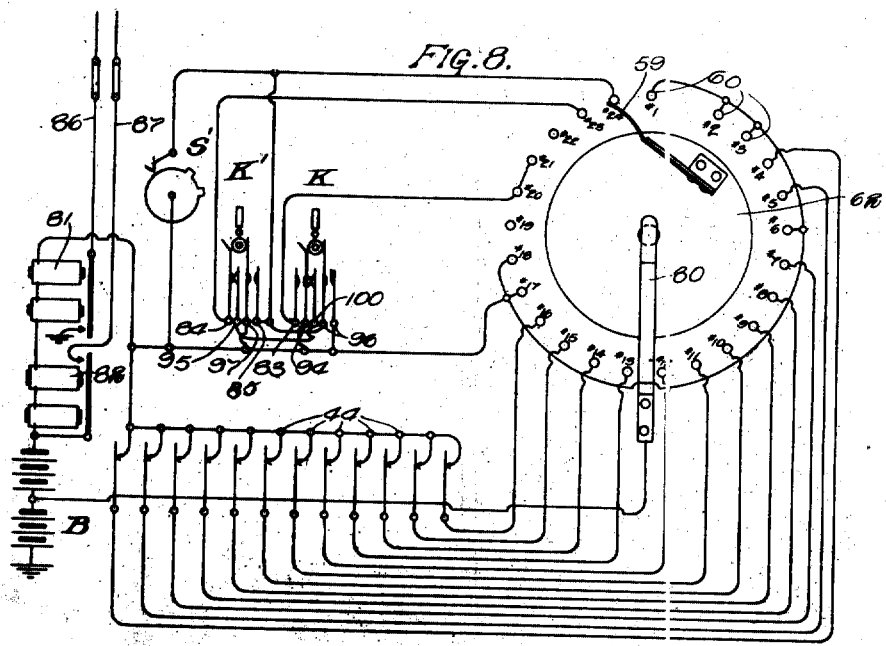

The electrical connections of the calling device shown in Fig. 8 are as follows: The wiper 59 is connected through the medium of a brush 80 with an intermediate point of the battery B. There are twenty four of the contacts 60 and the wiper 59 normally rests upon the last one. The impulses are transmitted from the calling device to the line through the medium of two relays 81 and 82. The first three of the contacts 60 are permanently connected with the relays 81 and 82. The space between the contacts 1 and 2 is longer than the space between the remaining contacts. The contacts 4 and 5 are connected with the relays through respective pairs of the springs 44, the contact 6 is permanently connected with the relays, while the remaining contacts up to and including the contact 16 are connected with the relays through the springs 44. The contacts 17 and 18 are permanently connected with the relays. The contact 19 is open. The contacts 20 and 21 are connected together and are also connected with the normally open spring 83 of a manually-operated key K. The contact 22 is open. The contact 23 is connected to a normally closed spring 84 of a key K′, and the contact 24 is connected to a normally open spring 85 of the other side of the same key. The relays 81 and 82 are adapted, when energized, to bridge the battery B between the two line conductors 86 and 87. Besides the keys K and K′ there is also shown associated with the calling device an impulse sending device S′ which may be operated to transmit a certain number of impulses, in this case two, through the relays 81 and 82 each time it is operated. This device may be a call box, such as is used in well-known district telegraph systems, and is diagrammatically represented herein by an impulse wheel which is adapted to contact twice with a brush or wiper during each revolution.

In Fig. 12 there is shown a line circuit comprising two conductors 88 and 89 across which there may be connected a number of substations, two of which (A′ and A²) are shown. Each substation is provided with a selector, as hereinbefore described, its magnet 13 being bridged across the line. The two contacts 31 and 32 are connected through two electric bells 91 and 92, respectively, to a local battery B′ and thence through said battery and the primary winding of an induction coil 93 to the arm 30. The bells 91 and 92 may be of the ordinary vibrating type. The secondary winding of the induction coil is bridged across the line conductors 88 and 89. Each substation is also provided with a telephone instrument which is bridged across the line. At the main or central station A the line conductors 88 and 89 terminate in contacts of a two-pole switch S, by means of which a calling device similar to that described herein may be connected to the line. In Fig. 12 only the relays 81 and 82 are shown. The manner in which said relays are controlled is fully shown in Fig. 8. The main station A is also provided with a telephone. By means of the switch S the calling device may be connected with any one of a number of different lines.

The complete operations by means of which the operator at the station A may signal one of the substations A′ or A² are as follows: It will be assumed that it is desired to call the substation A′ and that said substation is provided with a selector in which the pins 29 are placed as shown in Fig. 2. In said figure the pins 29 are so spaced that the code number of this station, as represented by the grouping of the impulses, is 3—3—3—5. In order to call the station A′ the operator must first operate the switch S to connect the calling device with the line upon which the substation A′ is situated, then place a finger in the finger hold allotted to that substation and operate the dial as heretofore explained. The cam wheels 43 must be so arranged that when the dial is operated through the medium of this finger hold it will separate the second, fifth and ninth pairs of the springs 44, counting from the left in Fig. 8, whereby the contact points 5, 9 and 13 in the group 60 are disconnected from the relays 81 and 82. When the dial and lever 74 are released, the wiper 59 begins to return to normal position. As the wiper 59 passes over the contact 1, the relays 81 and 82 are energized and cause one impulse of current to flow out over the line, whereby all the selectors are advanced one step. This first impulse is followed by a long pause, while the wiper is passing over the long space between the contacts 1 and 2. This pause causes all the selectors to be immediately released and their wheels 8 to be returned to normal position. This preliminary impulse is, therefore, for the purpose of insuring that all the selectors shall be in normal position before the selecting impulses begin to be sent in. As the wiper 59 passes over the remaining contacts 2 to 18, a total of fourteen impulses are transmitted to the selectors, which impulses are divided into four groups of three, three, three and five impulses, respectively, the groups being separated by pauses caused by the wiper passing over the contacts 5, 9 and 14, which contacts are disconnected from the relays 81 and 82 by the operation of the dial, as explained above. During these pauses the selector at the susbtation A′ is prevented from being released by the coöperation of the pins 28 and 29, while the selectors at each of the other substations will be released by at least one of these pauses. The wheel 8 at the substation A′ is advanced the full fourteen steps, whereby the arm 30 is brought into contact with the spring 31, and the next to the last pin 29 is brought into the path of the pin 28. The wheel 8, therefore, remains in this position until the wiper 59 passes over the contact 23, whereby one more impulse is transmitted through the selector, causing the wheel 8 to be advanced one more step to remove the pin 29 from the path of the pin 28, whereby said wheel is returned to normal position as soon as the magnet 13 is deënergized. When the arm 30 engages the contact 31, a circuit is closed through the bell 91, the battery B′, and the primary winding of the induction coil 93, whereby the operator at the substation A′ is signaled. Since the circuit of the bell includes one winding of the induction coil 93, the other winding of which is bridged across the line, the interruption of current in the bell circuit produces a buzz in the line circuit so as to signify to the operator at the main station A that the bell at the called substation is ringing. As has been explained, there are two bells 91 and 92 at each substation. The bell 92 might be used to signal a second operator at the same substation, or it might be used as an emergency bell. In order to cause the bell 92 to be rung, the attendant at the main office A, before operating the calling device, throws the lever of the key K to the right so as to close the contact between the springs 83 and 94, whereby the contacts 20 and 21 are connected with the relays 81 and 82. In this case two impulses are transmitted over the line as the wiper 59 passes over the contacts 20 and 21, whereby the arm 30 of the selector is carried past the contact 31 and into engagement with the contact 32, whereby the circuit of the bell 92 is closed. It will be seen that the circuit of the bell 92 also includes the primary winding of the induction coil 93, so that said coil serves to give the calling operator an answer-back signal whenever either bell is rung. When the key K is operated to cause the bell 92 to be rung, it disconnects the contact 23 from the relays 81 and 82 by separating the springs 94 and 100. In this case no impulse is sent out on the line to release the selector when the wiper 59 passes over the contact 23 and the bell 92 rings continuously. The selector may be released in this case by throwing the key K to the left momentarily, whereby an impulse is transmitted through the relays 81 and 82 by way of the brush 80, wiper 59, contact 24 and the springs 96.

If, before a call is made, the lever of the key K' is thrown to the right to separate the spring 84 from the spring 95, the key K remaining normal, no impulse will be sent out over the line when the wiper 59 passes over the contact 23, and the selector at the called substation will not be released, but its bell 91 will ring continuously. In order to release the selector in this case, the key K' is thrown to the left momentarily after the wiper 59 has come to rest upon the contact 24, whereby the relays 81 and 82 are energized momentarily.

It is evident from the above description that the position of the first three pins 29 in the wheel 8 of the selectors determines their code numbers, or the manner in which the impulses must be grouped to operate them. For instance, it will be seen that by changing the positions of one or more of these pins in the selector shown, it may be made to respond to the numbers 3—3—4—4, 3—3—5—3, etc. Although each selector is adapted to respond to impulses which are separated into groups in a certain way, it will also respond to fourteen impulses in one individual group, so that all stations may be signaled simultaneously as well as selectively. Some certain number on the dial of the calling device may be reserved for calling all the stations simultaneously, and the wheels 43 are so arranged that when this number is called the impulses will not be broken into small groups.

By duplicating the contacts 31 and 32, as shown at 31$^a$ and 32$^a$ in the substation A$^2$, the bells 91 and 92 may be rung alternately, or any number of contacts may be employed and each contact may be connected to a separate bell if desired. The impulses for stepping the wiper 30 from one contact to the next may be produced by the device S' (Fig. 8), said device being arranged to produce the exact number of impulses necessary to move the wiper from one contact to the next. The ratchet wheel 8 of the selector may be provided with as many additional pins 29 as there are additional contact points, so that the wiper may be held on any contact as long as desired. The code numbers of all the stations may be so chosen that the impulses for stepping the wiper at one station from one contact to another will not cause the wiper at any of the other stations to be moved into engagement with its contacts. When there is a plurality of contacts on the selector they should preferably be at least two steps apart, so that the selector may be released from any position by a single impulse.

The electrical connections shown in Fig. 9 are the same as those shown in Fig. 8 with the exception that in Fig. 9 all the contacts 2 to 18, inclusive, are connected with the line relays through the springs 44, while in Fig. 8 some of the contacts are connected to the relays direct. The arrangement shown in Fig. 9 is the more general arrangement, since it permits of a greater number of codes to be called. It is often found that all the combinations desired may be obtained without ever opening certain pairs of the springs 44, in which case these springs and their corresponding wheels 43 may be omitted from the calling device and the corresponding contacts 60 connected to the relays 81 and 82 direct, as shown in Fig. 8.

As shown herein, it will be seen that the battery B is normally entirely disconnected from the line circuit, and when an impulse is sent out, the two terminals of the battery are connected with the opposite sides of the line simultaneously. This is found to be much more satisfactory than the usual arrangement, where one terminal of the battery is permanently connected with one side of the line and the impulses are produced by opening and closing the connection between the other side of the line and the other side of battery, as this old arrangement has been found to unbalance the line to a certain extent and interfere with the operation of the selectors.

In Fig. 13 there is shown an arrangement wherein the second contact of the selector instead of controlling a second or emergency bell, as shown in Fig. 12, controls a semaphore signal which may be located beside the railway track, whereby the despatcher may set the signal himself in case it is impossible for any reason to obtain a response from the way station operator. The semaphore may be of any suitable type which may be controlled electrically from a distance and is herein represented as being provided with a motor 100, which is included in a normally closed circuit to hold the semaphore in its safe position. At D there is shown an answer back device in the form of a sender, such as is generally used in district telegraph systems. This answer back device sends back to the sending operator a distinctive signal to inform him that the semaphore at the station desired has been operated. The operation of the system as shown in Fig. 13 is as follows. The answer back device D is normally held in its set position by the magnet 101. When the selector arm 102 is operated to make contact with the second contact point 103, the magnet 101 releases the answer back device, whereupon the wheel 104 makes one complete revolution, while the arm 105ª rises, and separates the springs 105 in the motor circuit, whereby the semaphore is permitted to be rotated by gravity to the danger position. As the wheel 104 makes its revolution a series of impulses are transmitted from ground G² through the wheel 104, brush 106, thence through the two coils of the selector magnet 107 and the two-line conductors 108 and 109 in multiple, through an impedance coil 110, relay 111 and battery B⁴ to ground G⁴. The relay 111 controls the local circuit of a printing telegraph instrument which will record on a tape the signal returned by the answer back device D, whereby the despatcher is informed that the proper semaphore has been operated. It will be noted that the impulses for operating the selectors are transmitted over the two sides of the line in series, while the impulses returned to the central office by the answer back device D are transmitted over the two sides of the line in parallel, so that the devices intended to be operated by one kind of impulses are not affected by the other kind.

While I have illustrated certain embodiments of my invention, it is to be understood that I do not wish to be limited to those actually shown, as many changes and modifications will readily suggest themselves and will come within the scope of my invention.

What I claim as my invention is:—

1. In a code impulse sending device, a single dial, means for sending different codes of impulses by different operations of said dial, each operation transmitting a plurality of groups of impulses, said means including a code setting device automatically set by the operation of said dial.

2. In combination, a line and an impulse sending device, means for sending codes of impulses over said line, each code consisting of a plurality of groups of impulses, means for selectively varying the codes, said means including a dial, the variations of the codes obtained through the medium of the dial.

3. In a signaling system, an impulse generator adapted to generate impulses, an impulse spacer which splits up the impulses generated at each operation of the generator into groups, and a separate circuit for each impulse generated.

4. In a signaling system, a calling device, an impulse generator having a separate circuit for each impulse generated, impulse-controlling apparatus associated with each circuit, and a dial for operating the circuit-controlling apparatus.

5. In a signaling system, a calling device, an impulse transmitter having a separate circuit for each impulse generated, an impulse-controlling apparatus associated with each circuit, and a dial for operating the circuit-controlling apparatus.

6. In a signaling system, a calling device, an impulse transmitter having a separate circuit for each impulse generated, an impulse-controlling apparatus associated with each circuit, a dial for operating the circuit-controlling apparatus, and means for controlling the dial together with the impulse generator.

7. In a signaling system, a calling device, an impulse transmitter having a separate circuit for each impulse generated, an impulse-controlling apparatus associated with each circuit, and a dial for operating the circuit-controlling apparatus, said dial being provided with and controlled together with the impulse generator through the medium of suitable finger holds.

8. In a signaling system, a line, signaling apparatus associated with the line, a battery, means including a line relay for operating the signaling apparatus associated with the line, an impulse generator for operating the line relays, a source of electric energy for operating the line relays, and a source of electric energy for operating the signaling apparatus, the latter source being of higher voltage than the former.

9. In a signaling system, a line, a signaling device for the line, an impulse generator for the line for operating said signaling device, said impulse generator comprising an automatic impulse producer and a manual impulse producer, the said signaling device being equipped with releasing means adapted to respond to a single release impulse, the automatic section of the said impulse generator being provided with means for sending a preliminary release impulse to the line each time that the impulse generator is operated for operating the releasing means at the signaling device.

10. In a signaling system, an impulse transmitter, a dial for controlling the operation of said transmitter, and means whereby a single operation of said dial operates said transmitter to transmit a plurality of series of impulses.

11. In a signaling system, an impulse transmitter including an impulse generator for generating a series of impulses, means for dividing said series of impulses into a plurality of groups, and a dial for controlling the operation of said transmitter.

12. In a signaling system, means for transmitting a plurality of series of impulses, means for spacing apart the different series of impulses, and a dial for controlling by a single operation said transmitting and spacing means.

13. In a signaling system, an impulse transmitter including a series of contacts, a contact maker adapted to be rotated over said contacts, means for transmitting an impulse when said contact maker comes in contact with each contact, and an impulse spacer for preventing impulses being transmitted when said contact maker comes in contact with certain of said contacts to divide the impulses into three groups, each group consisting of a series of impulses.

14. In a signaling system, an impulse transmitter including a series of contacts, a contact maker adapted to be rotated over said contacts, means for transmitting an impulse when said contact maker comes in contact with each contact, an impulse spacer for preventing impulses being transmitted when said contact maker comes in contact with certain of said contacts, and a dial for controlling the operation of said transmitter.

15. In a signaling system, an impulse transmitter including a series of normally closed contacts, automatic means for opening certain of said contacts, and means for transmitting three series of impulses, the number of impulses in each series being dependent upon the particular contacts which are opened.

16. In a signaling system, an impulse transmitter including a series of normally closed contacts, a dial for opening certain combinations of said contacts, depending upon the extent of operation of said dial, and means for transmitting a plurality of series of impulses, the number of impulses in each series being dependent upon the particular contacts which are opened.

17. In a signaling system, means for transmitting a plurality of series of impulses, said means including a series of local circuits normally closed at one point and normally opened at a second point, an impulse spacer for opening three of said normally closed points, and a contact maker adapted to successively close said normally open points and to produce three series of impulses.

18. In a signaling system, means for transmitting a plurality of series of impulses, said means including a series of local circuits normally closed at one point and normally opened at a second point, an impulse spacer for opening certain of said normally closed points, a contact maker adapted to successively close said normally open points, and a rotary dial having finger holes for controlling the operation of said means.

19. In a signaling system, an impulse transmitter comprising a series of normally closed contacts, a contact maker, a series of contact points over which said contact maker is adapted to rotate, a rotary dial adapted upon its forward rotation to separate certain of said normally closed contacts, depending upon the extent of rotation of said dial, an arm controlled by the rotation of said dial, and means controlled by said arm for rotating said contact maker over said contact points, whereby a plurality of series of code impulses are generated.

20. In a signaling system, a line circuit, a battery normally disconnected from said line, a relay controlling said battery connection, and means for transmitting a series of impulses through said relay to thereby impress a series of code impulses on said line, said means including an impulse transmitter, a dial for controlling the operation of said transmitter, and means whereby a single operation of said dial operates said transmitter to transmit a plurality of series of impulses.

21. In a signaling system, a line circuit, a battery normally disconnected from said line, a relay controlling said battery connection, and means for transmitting a series of impulses through said relay to thereby impress a series of code impulses on said line, said means including an impulse transmitter including an impulse generator for generating a series of impulses, means for dividing said series of impulses into a plurality of groups, and a dial for controlling the operation of said transmitter.

22. In a signaling system, a line circuit, a battery normally disconnected from said line, a relay controlling said battery connection, and means for transmitting a series of impulses through said relay to thereby impress a series of code impulses on said line, said means including means for transmitting a plurality of series of impulses, means for spacing apart the different series of impulses, and a dial for controlling by a single operation said transmitting and spacing means.

23. In a signaling system, a line circuit, a battery normally disconnected from said line, a relay controlling said battery connection, and means for transmitting a series of impulses through said relay to thereby impress a series of code impulses on said line, said means including an impulse transmitter including a series of contacts, a contact maker adapted to be rotated over said contacts, means for transmitting an impulse when said contact maker comes in contact with each contact, and an impulse spacer for preventing impulses being transmitted when said contact maker comes in contact with certain of said contacts.

24. In a signaling system, a line circuit, a battery normally disconnected from said line, a relay controlling said battery connection, and means for transmitting a series of impulses through said relay to thereby impress a series of code impulses on said line, said means including an impulse transmitter including a series of contacts, a contact maker adapted to be rotated over said contacts, means for transmitting an impulse when said contact maker comes in contact with each contact, an impulse spacer for preventing impulses being transmitted when said contact maker comes in contact with certain of said contacts, and a dial for controlling the operation of said transmitter.

25. In a signaling system, a line circuit, a battery normally disconnected from said line, a relay controlling said battery connection, and means for transmitting a series of impulses through said relay to thereby impress a series of code impulses on said line, said means including an impulse transmitter including a series of normally closed contacts, automatic means for opening certain of said contacts, and means for transmitting a plurality of series of impulses, the number of impulses in each series being dependent upon the particular contacts which are opened.

26. In a signaling system, a line circuit, a battery normally disconnected from said line, a relay controlling said battery connection, and means for transmitting a series of impulses through said relay to thereby impress a series of code impulses on said line, said means including an impulse transmitter including a series of normally closed contacts, a dial for opening certain combinations of said contacts, depending upon the extent of operation of said dial, and means for transmitting a plurality of series of impulses, the number of impulses in each series being dependent upon the particular contacts which are opened.

27. In a signaling system, a line circuit, a battery normally disconnected from said line, a relay controlling said battery connection, and means for transmitting a series of impulses through said relay to thereby impress a series of code impulses on said line, said means including means for transmitting a plurality of series of impulses, said last-mentioned means including a series of local circuits normally closed at one point and normally opened at a second point, an impulse spacer for opening certain of said normally closed points, and a contact maker adapted to successively close said normally open points.

28. In a signaling system, a line circuit, a battery normally disconnected from said line, a relay controlling said battery connection, and means for transmitting a series of impulses through said relay to thereby impress a series of code impulses on said line, said means including means for transmitting a plurality of series of impulses, said last-mentioned means including a series of local circuits normally closed at one point and normally opened at a second point, an impulse spacer for opening certain of said normally closed points, a contact maker adapted to successively close said normally open points, and a rotary dial having finger holes for controlling the operation of said means.

29. In a signaling system, a line circuit, a battery normally disconnected from said line, a relay controlling said battery connection, and means for transmitting a series of impulses through said relay to thereby impress a series of code impulses on said line, said means including an impulse transmitter comprising a series of normally closed contacts, a contact maker, a series of contact points over which said contact maker is adapted to rotate, a rotary dial adapted upon its forward rotation to separate certain of said normally closed contacts, depending upon the extent of rotation of said dial, an arm controlled by the rotation of said dial, and means controlled by said arm for rotating said contact maker over said contact points, whereby a plurality of series of code impulses are generated.

30. A code impulse sending device having means for sending groups of impulses, selective means for varying the impulse groups at will, all of the selective operations of said means controlled by a single dial.

31. In a signaling system, a line circuit, an impulse sending device, a rotary dial having finger holes for controlling the operation of said device, means responsive to a single operation of said dial for transmitting a single impulse, followed by a prolonged pause, and then a series of groups of code impulses over said line, and selective means for varying said groups of impulses at will.

32. In a signaling system, a line circuit, means for transmitting a single impulse, followed by a prolonged pause, and then a series of groups of code impulses over said line, a rotary dial having finger holes for controlling said means by a single operation, and selective means for varying said groups of impulses at will.

33. In a signaling system, a line circuit, a plurality of stations on said line, a signal and a selective device at each station, an impulse transmitter, a dial for operating the same, means whereby a single operation of said dial the signal at any one of said stations can be selected and operated for a short period, and means in said impulse transmitter for enabling said selected signal to be operated continuously.

Signed by me at Chicago, Cook county, Illinois, this 1st day of March, 1912.

JOHN A. HULIT.

Witnesses:
ARTHUR J. RAY,
ALBERT ANDERSEN.